M. LACHMAN.
METHOD OF UNITING PLATES.
APPLICATION FILED JUNE 19, 1918.
1,294,680.
Patented Feb. 18, 1919.
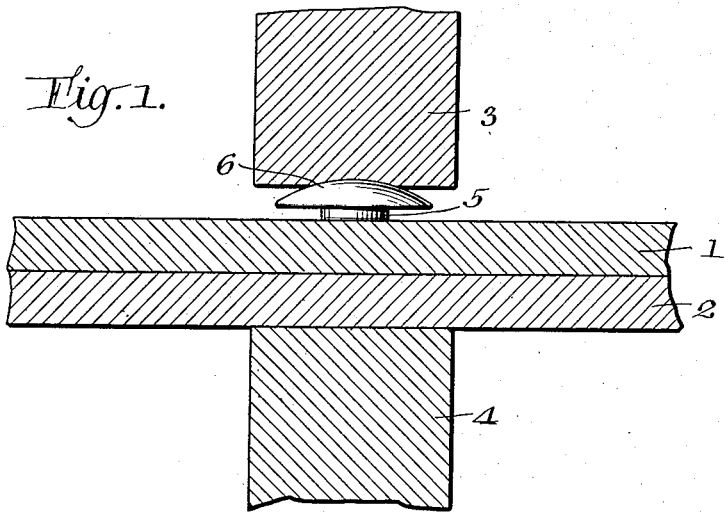
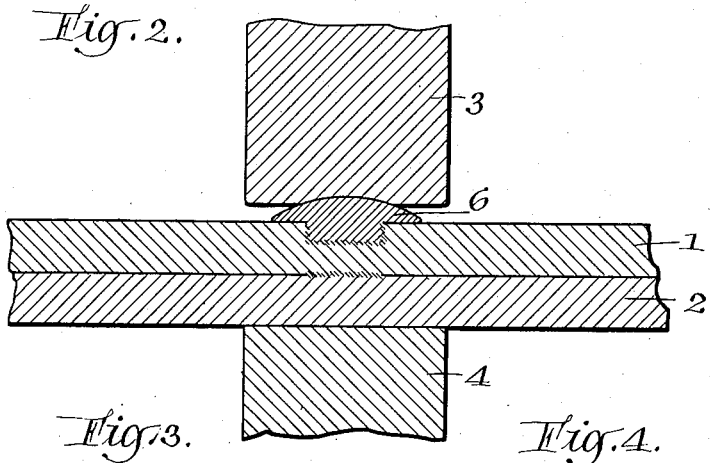
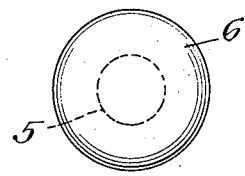
INVENTOR
*Maurice Lachman.*
BY
*Townsend & Decker*
ATTORNEYS

UNITED STATES PATENT OFFICE.

MAURICE LACHMAN, OF NEW YORK, N. Y., ASSIGNOR TO UNIVERSAL ELECTRIC WELDING COMPANY, OF NEW YORK, N. Y., A CORPORATION OF NEW YORK.

METHOD OF UNITING PLATES.

1,294,680.   Specification of Letters Patent.   Patented Feb. 18, 1919.

Application filed June 19, 1918. Serial No. 240,779.

*To all whom it may concern:*

Be it known that I, MAURICE LACHMAN, a citizen of the United States, and a resident of New York, in the county of New York and State of New York, have invented certain new and useful Improvements in Methods of Uniting Plates, of which the following is a specification.

This invention relates to a method of electrically welding superposed metal plates together face to face by a weld localized in a portion of their meeting surfaces.

The object of the invention is to enable very heavy plates to be electrically welded at spots in their opposed surfaces in a quick and efficient manner and whereby the resultant joint will be exceedingly strong and effective.

The invention is an improvement on the process described in United States Letters Patent No. 1,020,991, dated March 26th, 1912, wherein a separate welding button is placed on the outside of the sheets to be joined, said button serving to localize the current and pressure and effect a weld in a spot between the meeting surfaces of the sheets. According to the present invention a modified form of welding button is employed whereby when welding thick plates the maximum strength of the welded joint will be assured.

In welding thick plates a current of large volume and a heavy pressure is necessary to effect the weld between the plates. In the patented process when employed with heavy plates the small button heats up, due to the very heavy current and becoming soft does not have the necessary resistance to transmit the heavy welding pressure necessary to insure maximum strength in the welded joint between the plates as, before the meeting metal between the plates has been sufficiently forced together, the button merely squaches out and does not serve its intended purpose of localizing the pressure of the welding dies.

In accordance with the present invention a welding button is provided which is so formed that a part of it serves to conduct and radiate the heat away from the welding button proper and thereby prevents said button or that part of it which forms the current and pressure localizing piece becoming soft prior to the application of the heavy welding pressure.

In the accompanying drawings Figure 1 is a cross-section through two plates assembled between welding dies for welding according to this invention.

Fig. 2 is a similar view at the end of the welding operation.

Figs. 3 and 4 are side elevation and plan view respectively showing the form of welding button preferably employed.

The plates 1 and 2 are superposed one upon the other between the welding dies or electrodes 3, 4. 5 indicates a welding button of metal which is placed on the exterior surface of the plate 1 at the place at which it is desired to weld the plates 1 and 2 together. The welding button 5 is provided with an enlarged integral head 6 preferably resembling a rivet head.

The upper welding die or electrode engages the head 6 over a greater or less extent as desired. The electric heating current passes from the die or electrode 3 to the head 6, through the button 5, plates 1 and 2 and to the die or electrode 4. The surface of the button 5 contacting with the plate 1 determines the area of the path of the current through the plates and causes the plates to heat up at their contacting surface due to the resistance of the metal and the contact, all as well understood in the art. The button also tends to heat up but this heating action is held back to a considerable extent as the enlarged head 6 remains comparatively cool and conducts the heat away from the button and radiates it to the atmosphere. The head 6 holds the heating of the button 5 back sufficiently long for the meeting surfaces of the plates to reach welding heat at which time the heavy welding pressure is applied to force the plates together in line with the button, the button maintaining its rigidity to transmit the pressure.

In the final action the button is forced down into the metal and the head 6 seats on the outer surface of the plate 1, the button also to a greater or less extent welding to the plate. The finished product has an exterior appearance as if an ordinary riveting operation had been performed.

It will be understood that buttons may be employed on both plates if desired.

What I claim as my invention is:—

1. The method of uniting metal plates, consisting in superposing said plates between current supplying dies or blocks, applying a welding button to the exterior of said plates, passing heating current through said button and plates and applying pressure while at the same time holding back the heating of said button.

2. The method of uniting metal plates, consisting in superposing said plates between current and pressure supplying dies, applying to the outer surface of said plates a welding button having an enlarged head, bringing one of said dies into engagement with said enlarged head and applying heating current and pressure thereto to effect a welding of said plates at a spot determined by the size of said button.

Signed at New York, in the county of New York and State of New York, this 15th day of June A. D. 1918.

MAURICE LACHMAN.

Witnesses:
F. B. TOWNSEND,
F. E. ROESLER.